US006462760B1

(12) United States Patent
Cox, Jr. et al.

(10) Patent No.: US 6,462,760 B1
(45) Date of Patent: Oct. 8, 2002

(54) USER INTERFACES, METHODS, AND COMPUTER PROGRAM PRODUCTS THAT CAN CONSERVE SPACE ON A COMPUTER DISPLAY SCREEN BY ASSOCIATING AN ICON WITH A PLURALITY OF OPERATIONS

(75) Inventors: Patrick H. Cox, Jr.; David J. Schell, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/320,103

(22) Filed: May 26, 1999

(51) Int. Cl.[7] .................................................. G06F 3/00
(52) U.S. Cl. ........................ 345/835; 345/708; 345/837; 345/977; 345/861
(58) Field of Search ................................ 345/708–709, 345/764, 811, 812, 835, 837, 846, 847, 859, 861, 977

(56) References Cited

U.S. PATENT DOCUMENTS 5,317,687 A * 5/1994 Torres ......................... 345/823
5,687,331 A * 11/1997 Volk et al. ................ 345/861 X
6,201,540 B1 * 3/2001 Gallup et al. ................ 345/764
6,295,062 B1 * 9/2001 Tada et al. ................... 345/835

* cited by examiner

Primary Examiner—John Cabeca
Assistant Examiner—X. L. Bautista
(74) Attorney, Agent, or Firm—Myers Bigel Sibley & Sajovec; Jeanine S. Ray-Yarletts

(57) ABSTRACT

User interfaces, methods, and computer program products can conserve space on a computer system screen by associating an icon with a plurality of operations. In an illustrative embodiment, an icon's visual appearance is used to associate the icon with a particular operation. In response to input from a user, the icon's appearance changes to indicate that the icon is now associated with an alternative operation. Thus, a graphical user interface (GUI) for operating a computer system can use a single icon to represent and provide access to a plurality of operations that otherwise may require several icons, which can consume valuable space on a computer system display or monitor. Therefore, the user interfaces, methods, and computer program products may be particularly useful in small computer systems, such as laptop computers, handheld computers, palmtop computers, personal digital assistants (PDAs), and pervasive computing devices.

30 Claims, 5 Drawing Sheets

USER INTERFACES, METHODS, AND COMPUTER PROGRAM PRODUCTS THAT CAN CONSERVE SPACE ON A COMPUTER DISPLAY SCREEN BY ASSOCIATING AN ICON WITH A PLURALITY OF OPERATIONS

FIELD OF THE INVENTION

The present invention relates generally to the field of user interfaces for computer systems, and, more particularly, to user interfaces, methods, and computer program products that can conserve space on a computer system display screen.

BACKGROUND OF THE INVENTION

New hand-held or palmtop computers have been developed and marketed that are typically smaller than a laptop computer. These new types of computers may be called a personal digital assistant (PDA). Small or hand-held computing devices including, but not limited to, PDAs, cellular telephones, and computing devices used within appliances and automobiles, are often collectively referred to as "pervasive" computing devices. Pervasive computing devices are typically small enough to be held by one hand and include such features as handwriting recognition, communication software for Internet access, and the ability to hook up to a personal computer (PC) to exchange information therewith. FIG. 1 depicts a conventional pervasive computing device 22, which includes a display screen 24, operational buttons 26a, 26b, and 26c, and a stylus 28. A more extensive keyboard (not shown) may also be included as an attachment or as an integrated part of the pervasive computing device 22. The display screen 24 is typically made using "touch screen" technology, which allows a user to interact with the display screen 24 using, for example, their finger or the stylus 28. As pervasive computing devices evolve their capabilities may continue to expand with contemporary pervasive computing devices providing such features as electronic date and address books, e-mail, memo pads (handwriting recognition), Internet browsers, and phone/facsimile access.

Unfortunately, because it is generally desirable to keep the size of pervasive computing devices small, the display screen 24 size may also be limited. For example, a text replacement operation for a word processing program running on a desktop computer having a conventional monitor may involve a single dialog with three pushbuttons-find, replace, and replace all-aligned along the bottom of the dialog. The same operation executed on a pervasive computing device may involve repetition of the text replacement dialog in connection with each pushbutton operation as there may not be sufficient room to display all three pushbuttons simultaneously on the display screen. Thus, depending on the size limitations of the display screen and the particular operation being invoked, a user may be forced to navigate through multiple screen panels or windows or even forego certain information that would otherwise be available on computer systems having a larger monitor or display screen.

Consequently, there exists a need to improve the manner in which information is displayed on a computer system display or monitor to make better use of the display screen area, which may be size limited.

SUMMARY OF THE INVENTION

It is therefore an object of the present invention to provide improved user interfaces, methods, and computer program products for computer systems.

It is another object of the present invention to provide improved, user interfaces, methods, and computer program products that can conserve space on a computer system display screen.

These and other objects, advantages, and features of the present invention can be provided by associating an icon with a plurality of operations. In an illustrative embodiment of the present invention, an icon's visual appearance is used to associate the icon with a particular operation. In response to input from a user, the icon's appearance changes to indicate that the icon is now associated with an alternative operation. Thus, a graphical user interface (GUI) for operating a computer system can use a single icon to represent and provide access to a plurality of operations that otherwise may require several icons, which can consume valuable space on a computer system display or monitor.

In accordance with an aspect of the invention, an indicium, such as an arrow, is disposed on the icon to convey to the user that a plurality of operations can be invoked via the icon.

In accordance with another aspect of the invention, the indicium comprises a plurality of marks along with a pointer that can be moved by a user to point to each one of the marks. When the user moves the pointer to point to a specific mark or invokes a specific mark with, for example, a stylus or finger, the icon changes appearance to indicate that the icon is associated with a particular operation that corresponds to the identified mark.

In accordance with still another aspect of the invention, the icon's appearance can be changed by changing textual information disposed on the icon, by changing the color of the icon, or by changing the geometry (e.g., size or shape) of the icon.

Computer systems may have limited space on a display screen or monitor that can be used to provide the user with GUI elements such as icons, menus, and windows to perform various operations. Therefore, the user interfaces, methods, and computer program products according to the present invention may be particularly useful in small computer systems, such as laptop computers, handheld computers, palmtop computers, PDAs, and pervasive computing devices.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
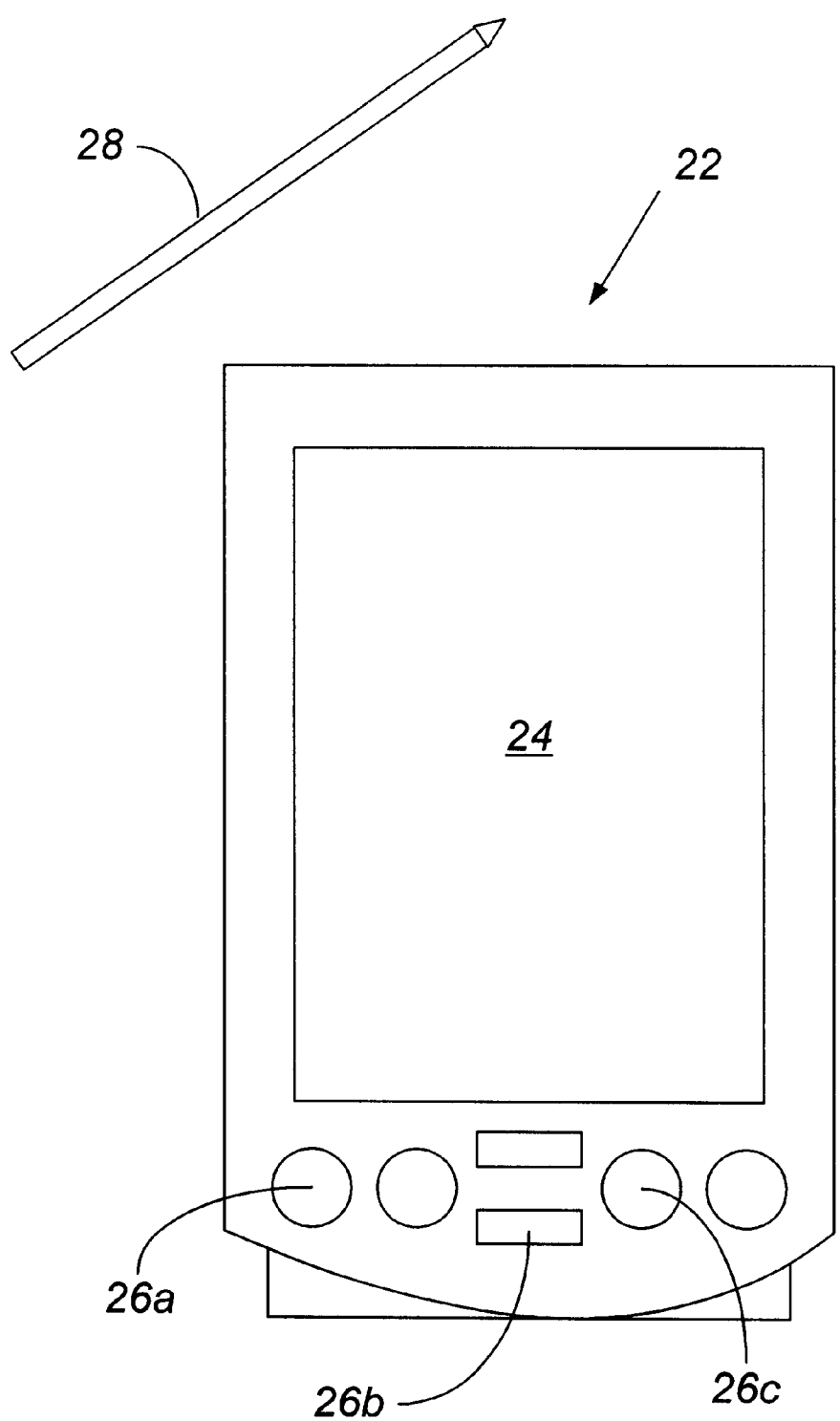
FIG. 1 illustrates a conventional pervasive computing device.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention can be embodied as a user interface for a computer system, a method, or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Figure 2:
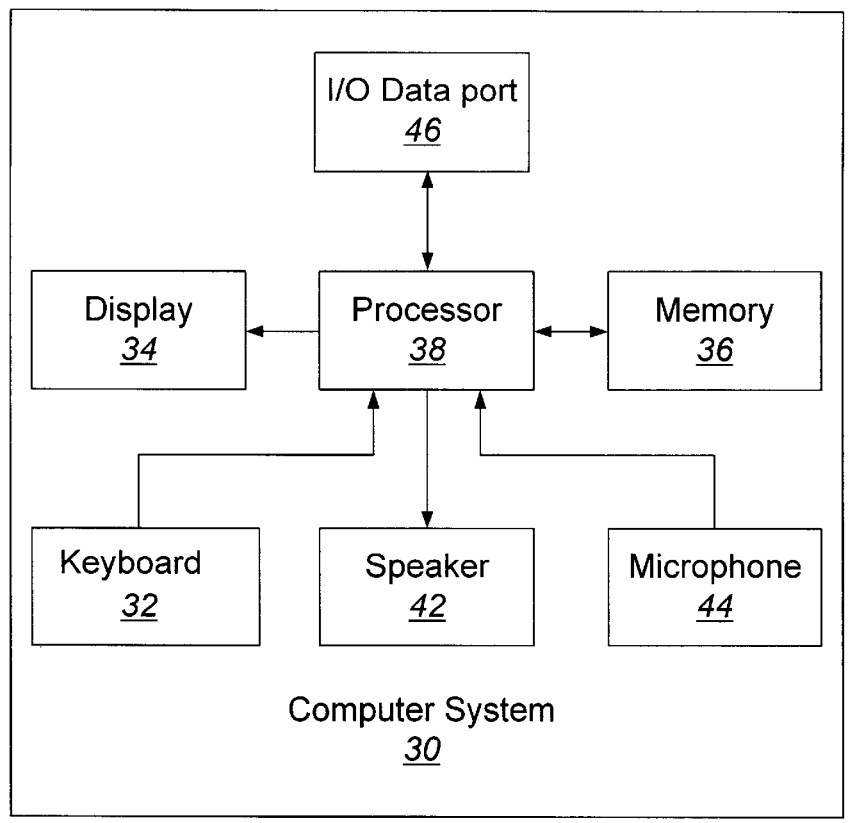
FIG. 2 is a high-level block diagram that illustrates an embodiment of a computer system in accordance with the present invention.

Referring now to FIG. 2, an exemplary embodiment of a computer system 30 in accordance with the present invention typically includes a keyboard or keypad 32, a display 34, and a memory 36 that communicate with a processor 38. The computer system 30 may further include a speaker 42, a microphone 44, and an I/O data port(s) 46 that also communicate with the processor 38. The I/O data port 46 can be used to transfer information between the computer system 30 and another computer system or a network (e.g., the Internet). These components are included in many conventional computer systems (e.g., desktop, laptop, or handheld computers) and their functionality is generally known to those skilled in the art.

Figure 3:
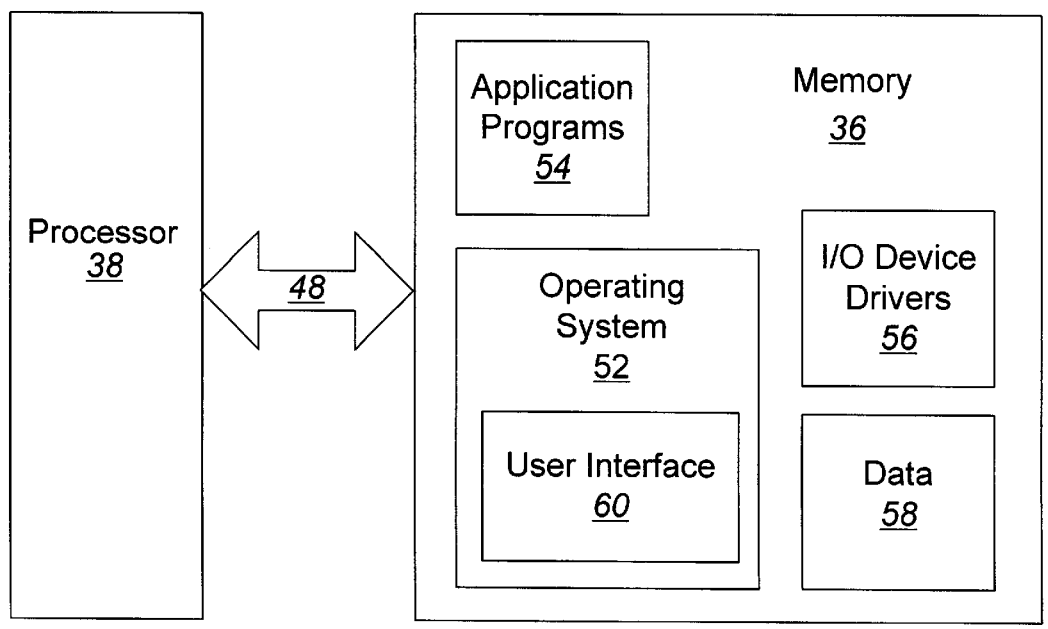
FIG. 3 is a more detailed block diagram of the computer system of FIG. 2 that illustrates user interfaces, methods, and computer program products in accordance with the present invention.

FIG. 3 is a more detailed block diagram of the computer system 30 that illustrates user interfaces, methods, and computer program products in accordance with the present invention. The processor 38 communicates with the memory 36 via an address/data bus 48. The processor 38 can be any commercially available or custom microprocessor suitable for an embedded application. The memory 36 is representative of the overall hierarchy of memory devices containing the software and data used to implement the functionality of the computer system 30. The memory 36 can include, but is not limited to, the following types of devices: cache, ROM, PROM, EPROM, EEPROM, flash, SRAM, and DRAM.

As shown in FIG. 3, the memory 36 may hold four major categories of software and data used in the computer system 30: the operating system 52; the application programs 54; the input/output (I/O) device drivers 56; and the data 58. Preferably, the operating system 52 is designed for embedded applications and is relatively compact to make the most efficient use of the memory 36. The I/O device drivers 56 typically include software routines accessed through the operating system 52 by the application programs 54 to communicate with devices such as the keyboard 32, the display 34, the speaker 42, the microphone 44, the I/O data port(s) 46, and certain memory 36 components. The application programs 54 comprise the programs that implement the various features of the computer system 30. And, finally, the data 58 represents the static and dynamic data used by the application programs 54, operating system 52, I/O device drivers 56, and any other software program that may reside in the memory 36.

The operating system 52 includes a user interface module 60 that manages a user's interactions with a GUI or the commands entered through the keyboard 32, the display 34 (e.g., a touch screen display), or other I/O device. For example, the user interface module 60 may be responsible for responding to a user's manipulation of a mouse, for responding to a user's interaction with various windows, for responding to a user's navigation and selection of menu items, and for responding to a user's manipulation of icons. In particular, the user interface module 60, in accordance with the present invention, can conserve space on a display 34 by providing a GUI in which a single icon can be used to provide access to a plurality of operations or actions that can be performed by the computer system 30.

The present invention is described hereinafter with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Figure 4:
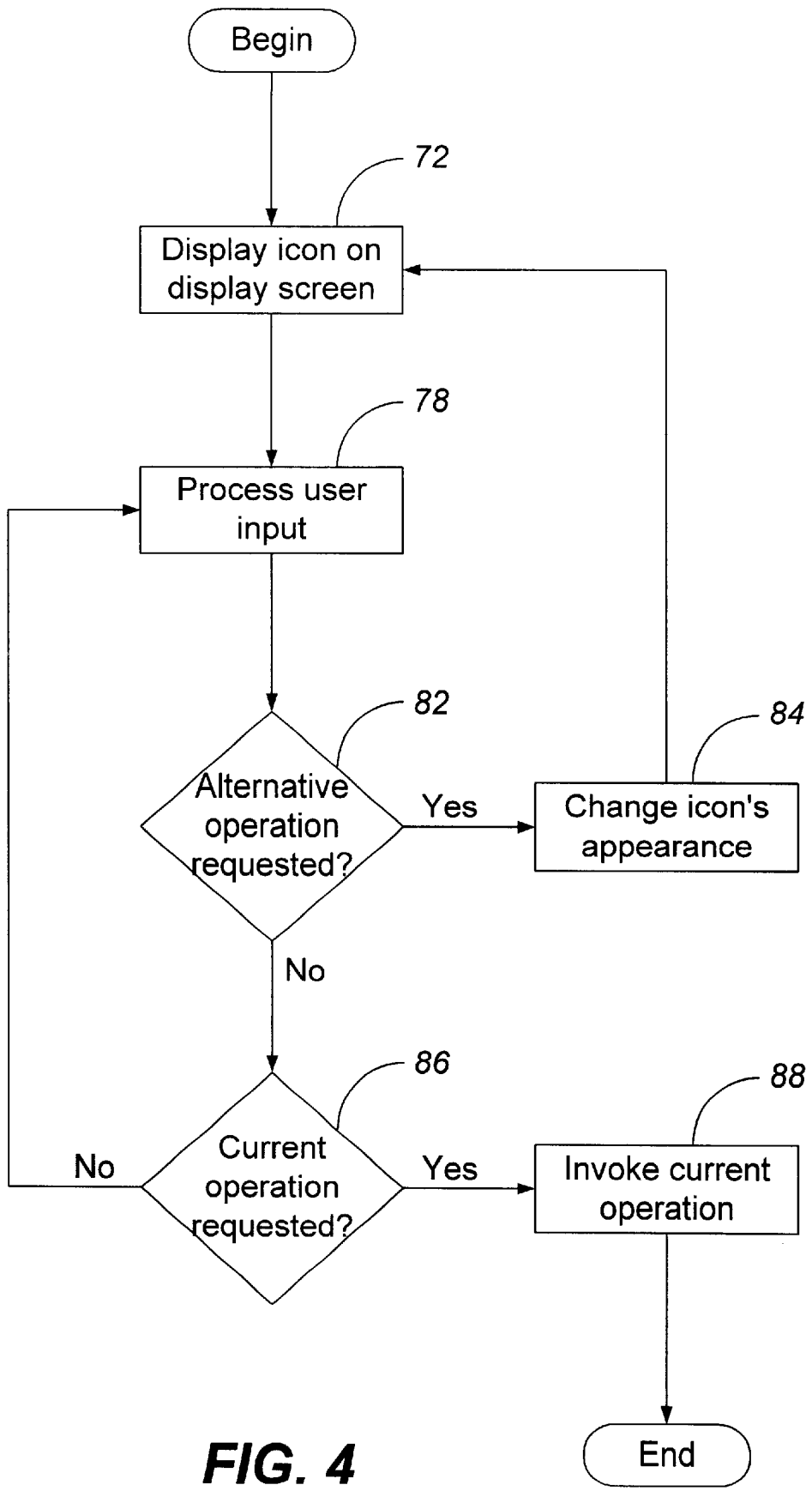
FIG. 4 is a flow chart that illustrates operations of the user interfaces, methods, and computer program products of FIG. 3.
Figure 5A:
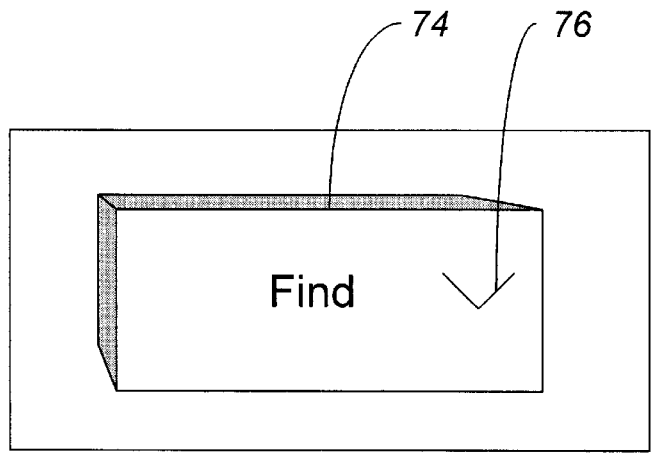
FIGS. 5A–5C illustrate a first embodiment of an icon that can be used in the user interfaces, methods, and computer program products of FIG. 3.

With reference to FIG. 4, operations of the user interface module 60 are described hereafter that can conserve space on the display 34. At block 72, the user interface module 60 displays an icon on the display 34. FIG. 5A illustrates one possible embodiment of an icon that can be used by the user interface module 60. A pushbutton icon 74 includes text disposed thereon that associates the pushbutton icon 74 with a particular operation. In the present embodiment, the text describes a "Find" operation that may be used as part of a text replacement function in a word processing program. In addition, the pushbutton icon 74 includes an indicium 76 that indicates to a user that the pushbutton icon 74 can be used to access or invoke a plurality of operations. The indicium 76 used in the present embodiment is a downward pointing arrow disposed on the face of the pushbutton icon 74. The type and placement of the indicium 76 can be varied to suit user preferences or for aesthetic purposes. It should also be understood that alternative types or styles of icons can be used without departing from the principles and concepts of the present invention disclosed herein.

Figure 5B:
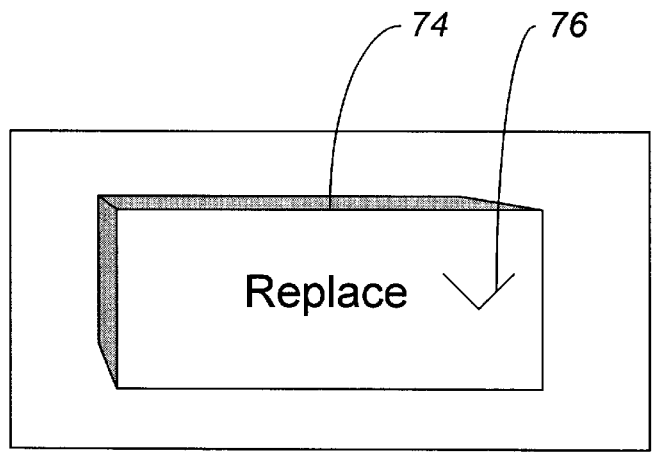
Figure 5C:
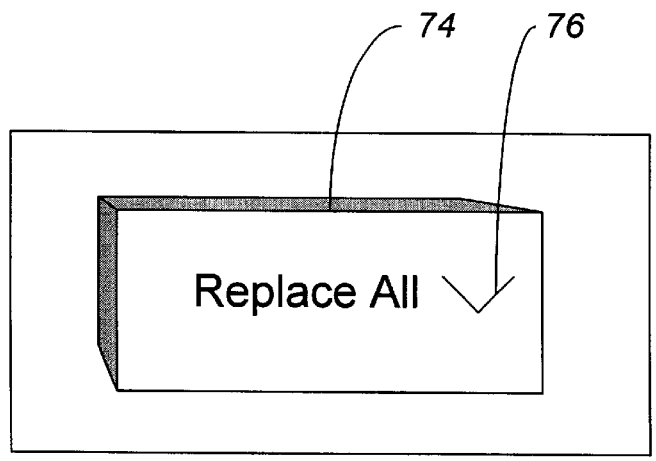

Returning to FIG. 4, the user interface module 60 processes an input command from a user at block 78. With regard to the pushbutton icon 74 of FIG. 5A, there may be two possible input commands entered by a user as represented by blocks 82 and 86: First, because the pushbutton icon 74 can be used to access or invoke a plurality of operations, the user may request an alternative operation at block 82. This can be implemented, for example, by invoking the pushbutton icon 74 on the display 34 with a stylus (see, e.g., FIG. 1, stylus 28) or finger, or with a cursor controlled by a mouse, while simultaneously invoking a "ctrl" or "alt" key from the keyboard 32. If an alternative operation is requested by the user at block 82, then the user interface module 60 causes the pushbutton icon 74 to change appearance at block 84. This is illustrated in FIG. 5B where the text disposed on the pushbutton icon 74 is changed from "Find" to "Replace" to associate the pushbutton icon 74 with an alternative operation. The color, geometry (e.g., shape or size), or other aspect of the pushbutton icon's 74 appearance could also be changed to associate the pushbutton icon 74 with an alternative operation. Preferably, however, the change made to the icon's 74 appearance does not cause the icon 74 to use additional space on the display 34. After the pushbutton icon's 74 appearance has been changed at block 84, the pushbutton icon 74 is displayed on the display 34 at block 72. FIG. 5C illustrates the pushbutton icon 74 after another alternative operation request by the user is input at block 78 and processed by the user interface module 60 at block 82. As shown in FIG. 5C, the pushbutton icon 74 is associated with a "Replace All" operation.

In a preferred embodiment, repeated alternative operation requests by the user at block 82 cause the icon's appearance to change in cyclical and sequential fashion corresponding to each of the plurality of operations that can be accessed or invoked via the icon 74. For example, the icon 74 will once again exhibit an appearance as shown in FIG. 5A upon receiving an alternative operation request by the user at block 82 when the icon 74 currently exhibits an appearance as shown in FIG. 5C.

If the user does not request an alternative operation at block 82, then a determination is made by the user interface module 60 at block 86 whether the current operation associated with the pushbutton icon 74 is requested. This can be implemented, for example, by invoking the pushbutton icon 74 on the display 34 with a stylus or finger or with a cursor controlled by a mouse, or by invoking the "enter" key from the keyboard 32. If the current operation associated with the pushbutton icon 74 is requested by the user at block 86, then the user interface module 60 invokes or initiates the current operation at block 88.

Figure 6A:
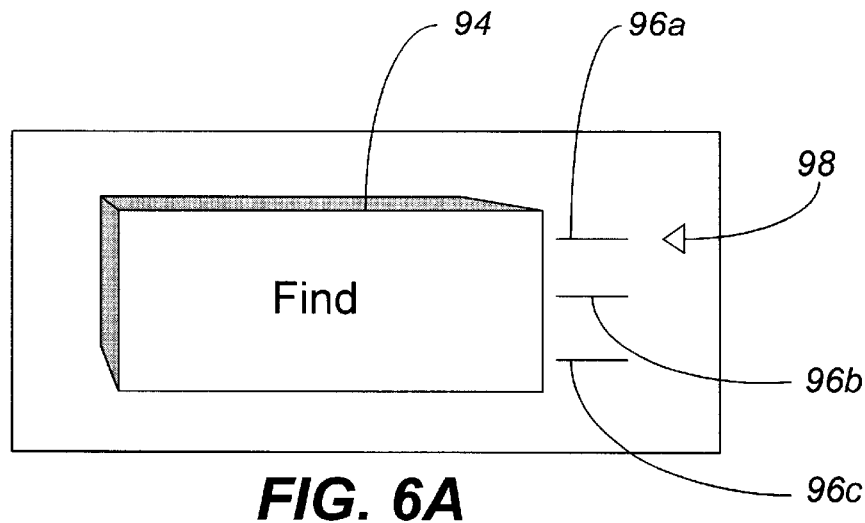
FIGS. 6A–6C illustrate a second embodiment of an icon that can be used in the user interfaces, methods, and computer program products of FIG. 3.
Figure 6B:
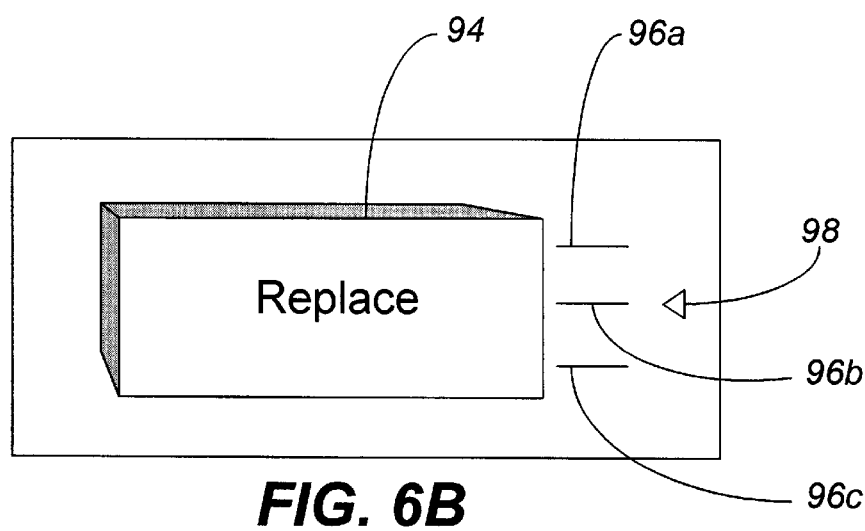
Figure 6C:
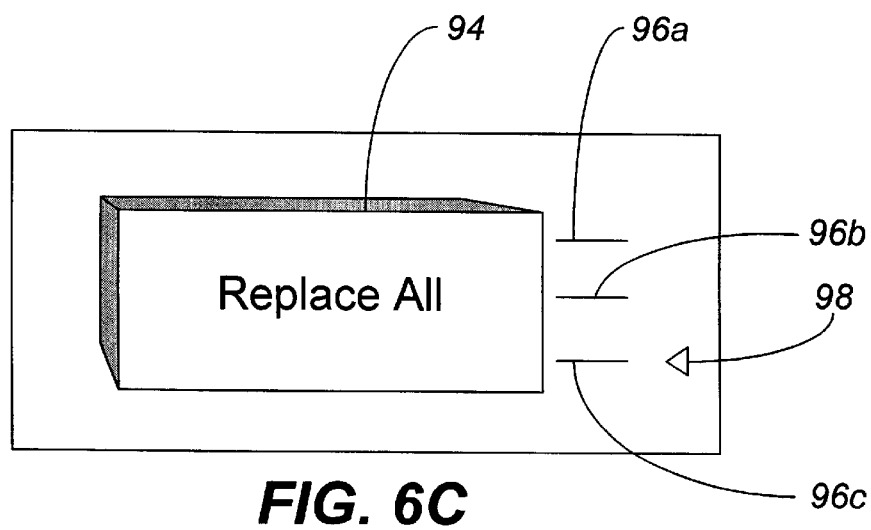

FIGS. 6A–6C illustrate a second possible embodiment of an icon that can be used by the user interface module 60. As shown in FIGS. 6A–6C, a pushbutton icon 94 can be used that is similar to the pushbutton icon 74 of FIGS. 5A–5C. The pushbutton icon 94 includes text disposed thereon that associates the pushbutton icon 94 with a particular operation (ie., "Find," "Replace," and "Replace All"). The pushbutton icon 94, however, differs from the pushbutton icon 74 of FIGS. 5A–5C in the indicium used to indicate to a user that the pushbutton icon 94 can be used to access or invoke a plurality of operations. As shown in FIGS. 6A–6C, the indicium comprises a plurality of marks 96a, 96b, and 96c that are positioned proximal to the pushbutton icon 94 in a preferred embodiment. Preferably, the number of marks 96a, 96b, 96c correspond to the number of operations that can be accessed or invoked through the pushbutton icon 94.

In addition, to the plurality of marks 96a, 96b, and 96c, the indicium preferably comprises a movable pointer 98 that points to one of the marks 96a, 96b, and 96c to indicate that the pushbutton icon 94 is associated with a particular operation. For example, in FIG. 6A, the movable pointer 98 points to mark 96a, which indicates that the pushbutton icon 94 is currently associated with the "Find" operation. Similarly, in FIG. 6B, the movable pointer 98 points to mark 96b, which indicates that the pushbutton icon 94 is currently associated with the "Replace" operation. Finally, in FIG. 6C, the movable pointer 98 points to mark 96c, which indicates that the pushbutton icon 94 is currently associated with the "Replace All" operation. The type, appearance, and placement of the marks 96a, 96b, and 96c and the movable pointer 98 can be varied to suit user preferences or for aesthetic purposes.

The marks 96a, 96b, and 96c and the movable pointer 98 can also be used by a user to input a request for an alternative operation as discussed hereinbefore with reference to blocks 78 and 82 of FIG. 4. To select an operation for the pushbutton 94, a user can invoke the mark 96a, 96b, or 96c on the display 34 that is associated with the desired operation with a stylus or finger, or with a cursor controlled by a mouse. For example, if the pushbutton icon 94 is currently associated with the "Find" operation as shown in FIG. 6A, a user can invoke mark 96c to cause the pushbutton icon 94 to be associated with the "Replace All" operation as shown in FIG. 6C. Alternatively, a user may use a stylus or finger to slide the movable pointer 98 along the display 34 to point to the mark 96a, 96b, or 96c that corresponds to the desired operation.

The flow chart of FIG. 4 illustrates the architecture, functionality, and operation of a possible implementation of the user interface module 60 of the operating system 52. In this regard, each block may represent a module, segment, or portion of code, which comprises one or more executable instructions for implementing the specified logical function (s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of operating a computer system having a display screen, comprising the steps of:
    displaying an icon on the display screen that has an appearance that associates the icon with a first operation selected from a plurality of operations that can be accessed via the icon;
    receiving user input selecting a second one of the plurality of operations; and
    changing the icon's appearance by changing text disposed on the icon such that the icon is associated with the selected second one of the plurality of operations and the icon does not use additional space on the display screen.

2. A method as recited in claim 1, further comprising the step of:
    changing the icon's appearance in cyclical fashion in response to the user input such that the icon exhibits a unique appearance for each of the plurality of operations.

3. A method as recited in claim 1, further comprising the step of:
    displaying an indicium that is associated with the icon and that indicates the plurality of operations can be accessed via the icon.

4. A method as recited in claim 3, wherein the indicium is an arrow disposed on the icon.

5. A method as recited in claim 3, wherein the indicium comprises a plurality of marks positioned proximal to the icon.

6. A method as recited in claim 5, wherein the indicium further comprises a movable pointer that can be positioned to point to one of the plurality of marks.

7. A method as recited in claim 6, wherein the user input comprises the step of repositioning the movable pointer.

8. A method as recited in claim 5, wherein the user input comprises the step of invoking one of the plurality of marks.

9. A method as recited in claim 1, wherein the icon comprises a button.

10. A method as recited in claim 1, wherein the changing step comprises the step of changing a color of the icon.

11. A method as recited in claim 1, wherein the changing step comprises the step of changing a geometric aspect of the icon.

12. A method as recited in claim 1, wherein the changing step comprises the step of changing the icon's appearance by replacing existing text disposed on the icon with new text.

13. A user interface for a computer system having a display screen, comprising:
    means for displaying an icon on the display screen that has an appearance that associates the icon with a first operation selected from a plurality of operations that can be accessed via the icon;
    means for receiving user input selecting a second one of the plurality of operations; and
    first means for changing the icon's appearance by changing text disposed on the icon such that the icon is associated with the selected second one of the plurality of operations and the icon does not use additional space on the display screen.

14. A user interface as recited in claim 13, further comprising:
    means for displaying an indicium that is associated with the icon and that indicates the plurality of operations can be accessed via the icon.

15. A user interface as recited in claim 14, wherein the indicium is an arrow disposed on the icon.

16. A user interface as recited in claim 14, wherein the indicium comprises a plurality of marks positioned proximal to the icon.

17. A user interface as recited in claim 16, wherein the indicium further comprises a movable pointer that can be positioned to point to one of the plurality of marks.

18. A user interface as recited in claim 13, wherein the icon comprises a button.

19. A user interface as recited in claim 13, wherein the first means for changing comprises second means for changing a color of the icon.

20. A user interface as recited in claim 13, wherein the first means for changing comprises second means for changing a geometric aspect of the icon.

21. A user interface as recited in claim 13, wherein the first means for changing comprises second means for changing the icon's appearance by replacing existing text disposed on the icon with new text.

22. A computer program product for operating a computer system having a display screen, comprising:
    a computer readable storage medium having computer readable program code means embodied therein, the computer readable program code means comprising:
        computer readable code means for displaying an icon on the display screen that has an appearance that associates the icon with a first operation selected from a plurality of operations that can be accessed via the icon;
        computer readable code means for receiving user input selecting a second one of the plurality of operations; and
        first computer readable code means for changing the icon's appearance by changing text disposed on the icon such that the icon is associated with the selected second one of the plurality of operations and the icon does not use additional space on the display screen.

23. A computer program product as recited in claim 22, further comprising:
    computer readable program code means for displaying an indicium that is associated with the icon and that indicates the plurality of operations can be accessed via the icon.

24. A computer program product as recited in claim 23, wherein the indicium is an arrow disposed on the icon.

25. A computer program product as recited in claim 23, wherein the indicium comprises a plurality of marks positioned proximal to the icon.

26. A computer program product as recited in claim 25, wherein the indicium further comprises a movable pointer that can be positioned to point to one of the plurality of marks.

27. A computer program product as recited in claim 22, wherein the icon comprises a button.

28. A computer program product as recited in claim 22, wherein the first computer readable program code means for changing comprises second computer readable program code means for changing a color of the icon.

29. A computer program product as recited in claim 22, wherein the first computer readable program code means for changing comprises second computer readable program code means for changing a geometric aspect of the icon.

30. A computer program product as recited in claim 22, wherein the first computer readable program code means for changing comprises second computer readable program code for changing the icon's appearance by replacing existing text disposed on the icon with new text.

* * * * *